Nov. 10, 1953     J. J. ARPS     2,659,046
GEOPHYSICAL EXPLORATION USING RADIO ACTIVE MATERIAL
Filed Oct. 19, 1948     3 Sheets-Sheet 1

Inventor
Jan Jacob Arps
By Mason, Kolehmainen, Rathburn & Wyss
Attys.

Nov. 10, 1953   J. J. ARPS   2,659,046
GEOPHYSICAL EXPLORATION USING RADIO ACTIVE MATERIAL
Filed Oct. 19, 1948   3 Sheets-Sheet 3

Formation Resistance $R_2$
(In terms of mud resistance $R_1$)

$$\frac{I_1}{I_0} = \frac{1}{1 + \frac{R_1}{R_2}}$$

FIG. 8

Source of light
Mirror on Galvanometer coil.
Motor

FIG. 9

Inventor
Jan Jacob Arps
By
Mason, Kolehmainen, Rathburn & Wyss
Attys.

Patented Nov. 10, 1953

2,659,046

UNITED STATES PATENT OFFICE 2,659,046

GEOPHYSICAL EXPLORATION USING RADIOACTIVE MATERIAL

Jan Jacob Arps, Tulsa, Okla.

Application October 19, 1948, Serial No. 55,301

27 Claims. (Cl. 324—1)

The present invention relates to signal transmission, more particularly to methods and apparatus for transmitting signals from one point to another through a fluid medium, and it has for an object the provision of new and improved methods of and apparatus for transmitting signals from a bore hole to the surface of the earth, which signals may be indicative, for example, of one or more characteristics of the earth's formation.

In transmission of signals from a bore hole to the surface, as in electrical logging of formations traversed by bore holes, it has been customary in the past first to drill the hole, then to remove the drilling equipment, and finally to lower into the bore hole a suitable arrangement of electrodes suspended from an electrical cable. In this sequence of operations the necessity for interruption of the drilling operation and the removal of the drilling tools from the bore hole constitutes an undesirable feature.

In my copending application Serial No. 783,280, filed October 31, 1947, of which the present application is a continuation-in-part, there are disclosed new and improved methods and apparatus which make it possible to transmit signals from a bore hole to the surface without the use of electrical connections extending from the surface of the earth to the formation being investigated. When applied to logging, the logging operation is carried on simultaneously with the drilling operation and it is continuous in nature so that an operator can observe at all times characteristics of the formation being drilled instead of having to wait until the hole has been completed before obtaining this information.

In the main, the method disclosed in my copending application comprises flowing a stream of carrier fluid from the bore hole to the top of the bore hole, releasing into said stream a detectable tracer representative of the physical condition of the formation being drilled and detecting the tracer at the top of the bore hole to obtain an indication or signal representing the physical condition or characteristic of the hole. The detectable tracer may be a radioactive substance, such as radiophosphorus, radiocadmium, or radioiodine which may be released, as from an electrode by electrolysis, and in amounts proportional to the resistivity or conductivity or spontaneous potential of the formation, or the tracer may be the cuttings irradiated by neutron bombardment. The proportionality may result from variation in amplitude or frequency of release— or both may be varied in transmitting signals of two variables.

In my aforesaid copending application, the release of tracer into the mud stream is made to be proportional to the signal it is desired to transmit to the surface. During the drilling process it sometimes happens that the rate of flow of mud changes. This may be due to temporary obstruction of flow passages through the bit, a change in steam pressure on the pumps, or because the driller feels that the drilling rate can be improved by a faster or slower mud circulation rate. As a result, there is a change in the signal detected at the surface of the earth. For example, in the case of an amplitude modulated signal, the amplitude of the signal detected at the surface is dependent upon the concentration of radioactive tracer material in a given volume of mud, so that a change in the rate of flow will cause an inverse change in the strength of the received signal.

Accordingly, an object of the present invention is to provide a new and improved signal transmitting method and apparatus in which a signal transmitted from a bore hole to the surface of the earth through the mud stream is independent of the rate of flow of the mud stream.

Another and more specific object of the present invention is to provide a new and improved method of and apparatus for transmitting signals from a bore hole to the surface of the earth comprising the step of and apparatus for releasing the tracer material so as to compensate for variations in the rate of flow of the mud stream.

Another and more specific object of the present invention is to provide a method of and apparatus for transmitting signals from a bore hole to the surface of the earth in which the tracer material is released at a rate proportional to the rate of flow of the mud stream, thereby to compensate for variations in the rate of flow.

A further object of the present invention is to provide a new and improved method of and apparatus for transmitting signals from a bore hole to the surface of the earth in which the tracer material is released independently of the rate of flow of the mud stream but wherein the received signal is modified in response to the rate of flow thereby to compensate for variations in the latter.

Another object of the present invention is to provide a new and improved method of and apparatus for transmitting signals from a bore hole to the surface of the earth which includes the step of releasing radioactive tracer material from electrodes through which current is passed and wherein polarization and the accumulation of colloidal materials in the region of one of the signal radiating electrodes are prevented, preferably by intermittently or periodically reversing the polarity of the electrodes and/or by locating the electrodes in the mud stream and causing the mud stream to flow past the electrodes at a high rate, thereby to clean the electrodes.

A further object of the present invention is to provide a method of and apparatus for logging bore hole formations whereby the received signal is made to increase with the resistivity of the formation being drilled. An advantage of this arrangement is that a larger or higher received signal is indicative of high resistivity of the formation.

Another object of the present invention is to provide a new and improved bore hole signal transmitting apparatus comprising one or more radioactive electrodes or sources of radioactivity which are located inside of a suitable shielding container so as to prevent operators and workers from being injured by the radioactive rays when the apparatus is handled.

A further object of the present invention is to provide a new and improved combined drill and signal transmitting apparatus in which the latter can be readily assembled as a subassembly and then secured to and in effect made a part of the drilling apparatus.

A still further object of the present invention is to provide new and improved radioactive signal injectors.

A further object of the present invention resides in new and improved signal transmitting and logging methods and apparatus providing an increased efficiency of generation and release of radioactive tracer material from the electrodes.

Other objects and advantages of the present invention will become apparent from the ensuing description of illustrative embodiments thereof, in the course of which reference is had to the accompanying drawings in which.

The method of the present invention is useful in the transmission of various signals from a bore hole to the surface of the earth through a circulating fluid and it is especially advantageous in bore hole logging. As applied to logging, the method comprises measuring a given characteristic such as conductivity, resistance, natural potential, temperature and the like, of geological strata at a determined depth within a bore hole and simultaneously releasing into the drilling fluid at or adjacent a point of such measurement a radioactive tracer in such manner as to be accurately representative of the value of the characteristic under observation. The release may be either amplitude or frequency modulated, that is, the release of the tracer into the circulating fluid stream may be continuous but vary in quantity with respect to time, which may be visualized graphically as tracer concentration amplitude versus time, or the release may be intermittent or periodic with respect to time which may be visualized graphically as tracer variation frequency versus time and, assuming it is the former for purpose of description, it is the quantity or amount of tracer released into the drilling fluid that varies in accordance with the beforementioned given characteristic. This process is continued as the drilling progresses, and as the characteristic of the formation changes, the amount of radioactive tracer introduced into the drilling fluid is accordingly changed. Circulation of the mud stream in the bore hole is utilized to carry the varying quantities of radioactive tracer to the top of the bore hole. Thus by measuring the radioactivity of the mud leaving the well and comparing it with the radioactivity of the mud entering the well the increase in radioactivity can be measured. This increase is in turn a function of the change in magnitude of the characteristic being measured at the bottom of the well. If the input mud is known to be substantially free of radioactivity then the amount of radioactivity of the output mud will be directly indicative of the magnitude of the characteristic measured in the bottom of the well. By correlating specific input and output mud radioactivity increments and by relating them to the depth of the point of measurement the subsurface formations may be readily logged, as will now be described.

Figures 1, 10, 11:
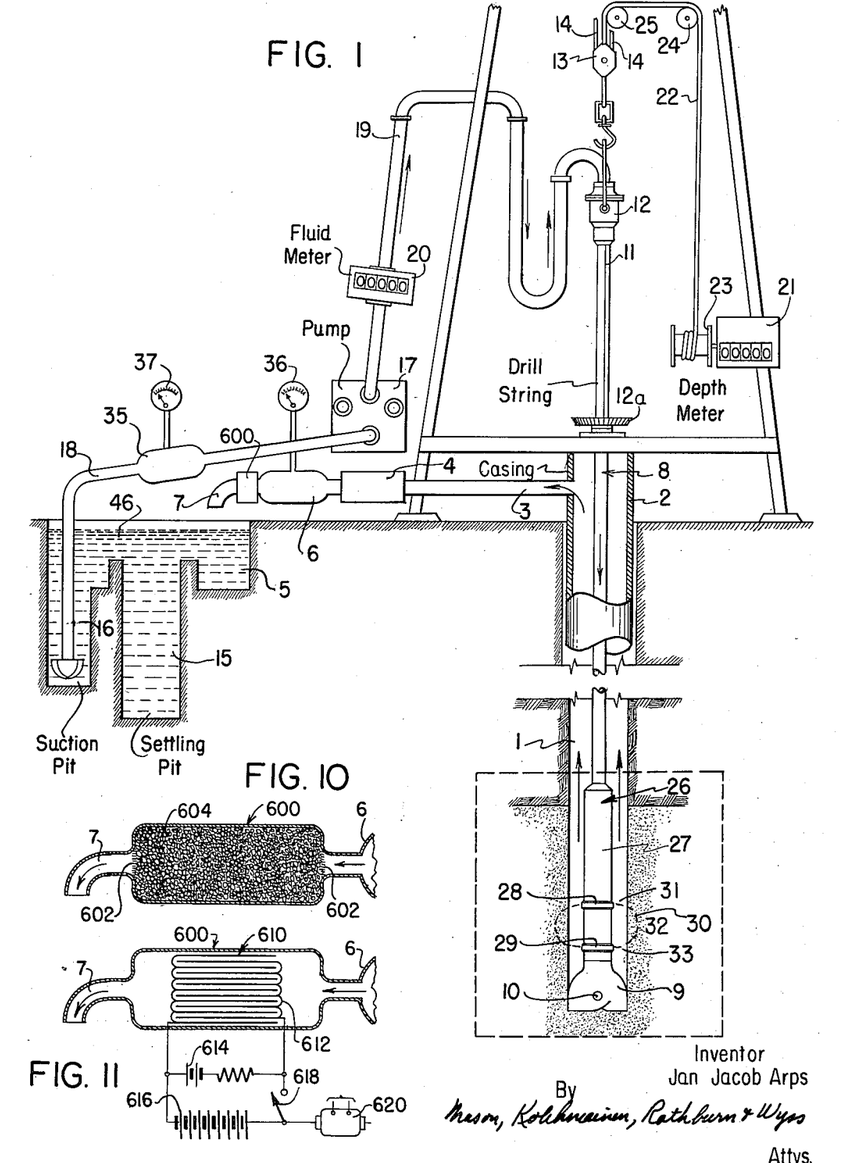
Fig. 1 is a longitudinal vertical section through a well being drilled with apparatus constructed in accordance with and utilizing the methods of the present invention.
Figs. 10 and 11 illustrate apparatus for removing the tracer from the fluid stream.
Figures 2, 3, 4, 5:
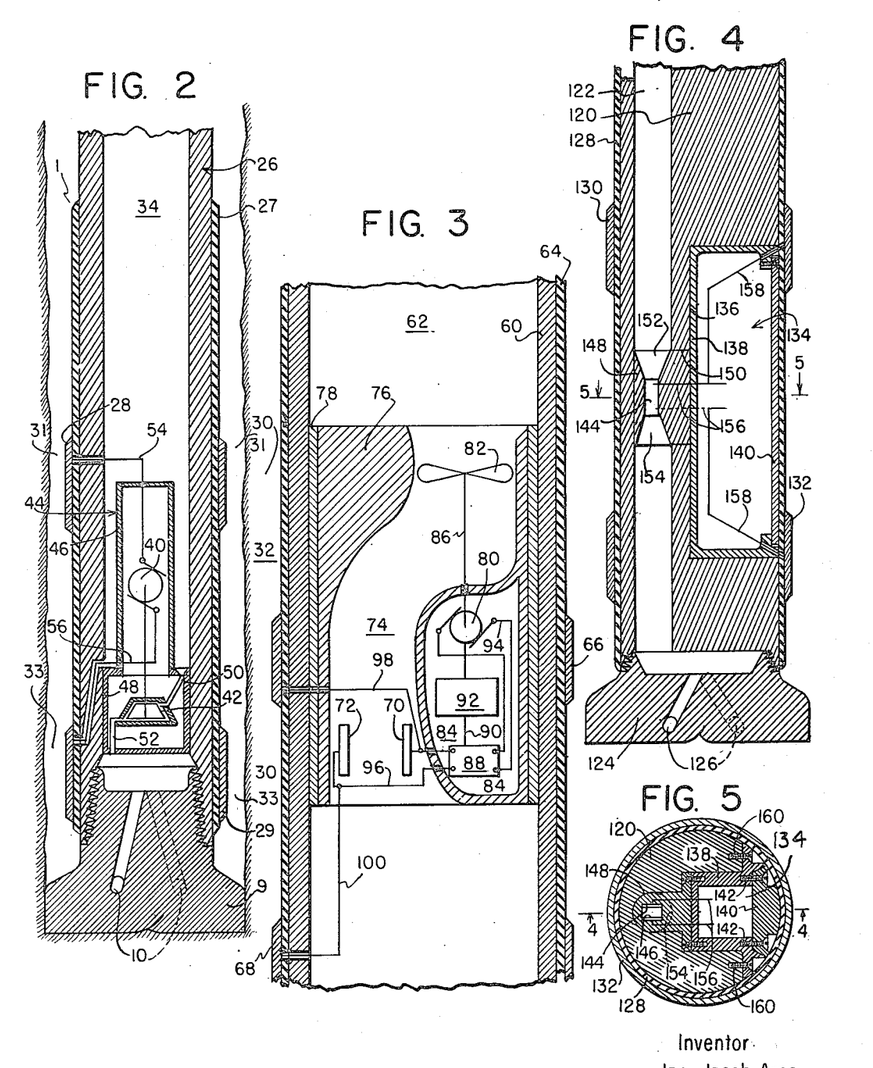
Fig. 2 is an enlarged axial cross sectional view through a specially constructed drill collar forming the lower portion of the drill string illustrated in Fig. 1 included within the dotted line region.
Fig. 3 is a fragmentary view of a modified form of construction of the lower portion of the drill string.
Fig. 4 is a similar view of still another embodiment of the invention.
Fig. 5 is a horizontal cross sectional view taken along the line 5—5 of Fig. 4.

Referring now to the drawings and more particularly to Figs. 1 and 2 thereof, the apparatus there illustrated for drilling a well or bore hole 1 in accordance with modern conventional rotary drilling practice, employs a circulating fluid, such as a suspension of clay solids in water and conventionally termed "rotary mud" or simply "mud," to carry the drill cuttings out of the bore hole as the drilling proceeds. The upper portion of the hole is lined with a surface casing 2, which usually extends but a comparatively short distance into the well. At its upper end the casing 2 is provided with a side outlet pipe 3 discharging into a shale shaker 4 having the function of separating the formation cuttings carried upward by the drill mud from the mud itself. The mud passes from the shaker 4 to a conventional mud ditch 5 through a radioactivity measuring device 6 and a discharge nozzle 7.

Extending into the well through the casing 2 and well bore 1 is a conventional hollow drill string designated generally by the numeral 8, which is connected at its lower end to a drill bit 9 having discharge openings 10 adjacent the cutting teeth or cutting edge of the bit. A Kelly joint 11 is connected to the upper end of the drill string and extends through a rotary table 12a mounted conventionally on the floor of a derrick. Rotation of the table 12a engages the squared sides of the Kelly joint 11 and thereby effects rotation of the drill string 8 in the usual manner to cause the bit 9 to cut through the formation. The upper end of the Kelly joint 11 is connected to the usual rotary hose swivel 12 and the entire drill string is suspended from a traveling block 13 which is adapted to be raised and lowered in the derrick by means of a cable 14 in accordance with conventional practice.

The apparatus for circulating the drilling fluid through the well bore comprises the mud ditch 5 previously referred to, settling pit 15, suction pit 16, and mud pump 17 having a suction pipe 18 leading to the suction pit and a mud discharge pipe 19 communicating with the drill pipe 8 through the swivel 12.

The volumetric flow of mud flowing through the discharge pipe 19 and well is measured by a fluid meter 20 which may be of any conventional type.

The depth of the well may be measured by any conventional method and this is commonly done by adding together the measurements of the lengths of all sections of drill pipe in the well, and by suitable marking of the kelly to determine how much of its length has descended into the well. However, depth measurement may also be conventionally obtained by suitable measuring devices well known in the art. One of the latter is diagrammatically represented in Fig. 1. It is a depth meter 21 operated by a measuring line 22 associated with a measuring pulley 23 and extending over pulleys 24 and 25 to the traveling block 13. This device measures the depth of the well and the length of the drill pipe in the well in response to the movement of the traveling block as it follows the downward movement of the drill string into the well.

The lower portion of the drill string 8 includes a novel drill collar 26 constructed in accordance with the present invention. The drill collar and bit, while illustrated in Fig. 1, may be best understood from Fig. 2 showing an axial cross section through the drill collar and the drill bit 9, which is detachably attached to the lower end of the collar. The collar may comprise one or more sections of drill pipe having an increased wall thickness in order to provide additional weight bearing on the bit and to decrease the whipping action which might otherwise cause the hole to deviate from a straight line. A considerable portion of the exterior of the drill collar is provided with a wrapping or covering 27 of insulating material, which may be any reasonably flexible material. Alternatively, the insulating material may be relatively inflexible, such, for example, as Bakelite which may be made in the form of a cylindrical casing and securely attached to the outside of the drill collar. A pair of spaced electrically conductive electrode rings 28 and 29, forming part of an amplitude modulated arrangement as assumed for descriptive purposes, are secured in spaced relationship to the exterior of the insulating sleeve 27.

The electrodes are connected to a suitable source of potential, to be described hereinafter, to effect a flow of current between them, the current flowing along the path indicated by the dotted lines 30 in Fig. 1. As shown, current flows through the drilling fluid into the earth's formation in the neighborhood of the drill collar. The current flows from that electrode which is connected to the positive terminal of the voltage source to the one connected to the negative terminal, the flow being from the electrode 28, assuming it to be connected to the positive terminal, through the mud section 31 adjacent electrode 28, through adjoining portions of the earth's formations located predominantly within the region 32 and thence through mud section 33 adjacent the electrode 29 to that electrode 29. The geometry of the electrode system is preferably such that the clearance space between the electrodes and the surrounding bore hole wall is small and accordingly the resistance of the mud sections 31 and 33 between the electrodes 28 and 29 and the surrounding bore hole wall is reduced as much as possible relative to the resistance of the earth's formation through which the current is flowing. Consequently, the magnitude of the current flow between the electrodes depends to a very large extent upon the conductivity or resistivity of the formation in the region 32.

As the drilling operation progresses, the drill bit encounters in its downward travel formations of varying resistivity and, accordingly, the magnitude of current flow in the described circuit varies substantially proportionately to the conductivity of the formation encountered. The flow of current through the electrodes is utilized to release a radioactive tracer material from the electrodes by electrolytic dissociation thereof into the drilling mud. Inasmuch as the current flow is dependent upon the conductivity of the formation of the earth's structure in the vicinity of the electrodes and the drill bit, the quantity of material thus released into solution in the drilling fluid is proportional to the conductivity of the formations and therefore indicative of the nature of the earth's structure in that vicinity.

If the drilling fluid separating the two electrode rings were stationary, the radioactive tracer, which may be in the form of ions entering the solution, by electrolytic dissociation from the electrode 28, which may be composed of radioactive material as hereinafter more fully disclosed, would be carried slowly downward to the opposite electrode by the existing electrostatic field between the two electrodes and subsequently would be deposited upon the electrode 29. Under ordinary drilling conditions the mud surrounding the drill string is usually in a state of rapid motion upwardly, i. e., in a direction opposite to the very slow downward travel tendency of the radioactive ions. Consequently, practically all of the radioactive ions released into the mud are immediately removed from the zone in which the electric field is present and remain in the mud as it is pumped to the earth's surface where they can be detected. Moreover, the amount of radioactive material released into the mud is proportional to the magnitude of current flow between the electrodes and consequently is at any instant representative of the conductivity of the earth's formation in the vicinity of the electrodes and thus representative of variations in the nature of the formation being drilled.

Generally stated, a radioactive tracer is utilized to represent the conductivity of the formation drilled. The tracer is gradually dispersed or introduced, in the vicinity of the formation being drilled, in successive increments of the drilling fluid column or stream rising in the well. The location of the formation may be ascertained by determining the rate of circulation of the fluid, as by considering the rate of pumpage, the rate of penetration of the bit and by measurement of the depth of the formation at which the observed radioactivity was acquired. It should be noted that the hydraulic fluid flow through the well is in the form of a closely restricted stream, the incoming fluid being confined within the bore of the drill string and within the bore 34 of the drill collar 26, while the outgoing fluid is confined within the annular space between the wall of the bore hole and outside of the drill string. While the drill string may be rotated at a fairly high speed in contact with the fluid moving upward on the outside of the drill string, very little mixing of the lineally spaced increments of the mud stream is known to occur. Therefore, the only changes produced in the radioactivity of any increment of the drilling fluid stream are developed or formed in the immediate vicinity of the positive electrode and are there produced by introduction from the electrode into the fluid of proportional quantities of radioactive tracer substance. Consequently, by tracing the radioactive substance in its rise from the drilled stratum to the top of the well and by then analyzing its radioactivity, the electrical conductivity of the stratum can be determined and its location can be properly logged.

The amount of radioactivity present in the drilling fluid can be determined by suitable radioactive detectors. One of these, the previously referred to detector 6, can be placed so as to detect and measure the radioactivity of the drilling fluid leaving the bore hole. A second detector 35 can be placed in the suction pipe 18. The detectors have suitable indicating devices 36 and 37 associated therewith. The detectors and indicating devices may be of a type described in my copending application Serial No. 783,230.

The comparison between the radioactivity content of the input and output mud to the well is made in a well known manner by taking into account the time lag involved in the travel of a mud log sample from the top of the hole to the formation at which the measurement is performed and from the formation back to the top of the bore hole. Correction for this time lag is effected by utilization of the indications of the fluid meter 20 and the depth indicator 21 in a manner well known in the art, see, for example, United States Patent No. 2,343,273, issued to John T. Hayward on February 22, 1944.

During the drilling process it sometimes appears that the rate of flow of fluid changes, due to temporary obstructions of the flow passages in the bit, a change in the steam pressure driving the mud circulating pump, or because the driller changes the circulation rate. The changes in the rate of flow of the fluid create changes in the detected signal at the earth's surface which, in the case of the amplitude modulated signals described, is proportional to the concentration of radioaitive material in a given volume of mud and because of this, a change in the rate of flow will cause an inverse change in the strength of the received signal.

One of the objects of the present invention is to eliminate changes in signal strength which are due to the fluctuations in the flow rate or velocity of the circulating mud.

Accordingly, in accordance with one of the important features of the present invention the release of tracer material is proportioned to the velocity of the fluid flow, whereby automatically to compensate for variations in the flow. One method of accomplishing this result is to control the release of tracer by a voltage varying with fluctuations of the fluid velocity, as by applying the variable voltage to the signal generating electrodes. In the illustrated embodiment of Figs. 1 and 2, a mud driven generator is utilized. The mud driven generator, see Fig. 2, includes a direct current generator 40 of known type generating a voltage proportional to its speed and a mud driven turbine 42 coupled to and driving the generator at a speed proportional to the flow of the mud. The generator and its driving means, which may be considered to form a mud driven turbo-generator, are mounted within a suitable housing 44 mounted inside of the drill collar. The generator may be mounted in the reduced diameter upper portion 46 of the housing around which the mud flows downwardly to the larger diameter portion 48 within which the turbine 42 is located. The turbine may be connected by suitable inlet and discharge passages 50 and 52, respectively, to the exterior of the housing whereby mud flows from above the housing downwardly through the turbine and through the outlet passages 10 in the drill bit 9 into the bore hole.

The generator may be suitably connected to the electrodes 28 and 29. As indicated, one terminal, as the positive one, is connected by an insulated conductor 54 to the electrode 28 while the electrode 29 is connected to the other generator terminal by conductor 56.

During the drilling operation fluid is pumped downwardly through the drill string and drill collar and returns upwardly around the exterior of the latter. As the fluid flows downwardly through the drill collar, it drives the turbine 42, and the latter drives the generator 40 at a speed proportional to the fluid velocity. The latter thus generates a voltage proportional to the rate of fluid flow which is applied across the electrodes 28 and 29. The current flow across the electrodes is thus proportional to the conductivity of the earth's formation in the vicinity of the drill bit and also to the rate of mud flow. Variations in mud flow cause variations in the applied voltage thereby automatically to compensate for variations in mud flow. Consequently, the radioactive material in the circulating stream detected by the detectors 6 and 35 is proportional to the conductivity and substantially independent of variations in the rate of flow of the mud.

It has been found that if a straight direct current is passed between two electrodes in a stream of rotary mud in the manner described above in connection with the apparatus shown in Figs. 1 and 2, the positive electrode, or anode, will become polarized and colloids will also accumulate on it. These interfere with the proper generation and release of the tracer materials into the fluid. It is an object of the present invention to eliminate these difficulties and to increase the efficiency in generating and releasing the tracer material. Another feature of the present invention resides in having larger amplitude indications to represent higher formation resistance. A further feature is to provide an apparatus which minimizes the danger to operators in handling the drill collar with its radioactive electrodes.

Referring now to Fig. 3, there is here illustrated a fragmentary view of a drill collar 60 having an internal mud flow passage 62 and surrounded by an insulating sleeve 64. These may be generally similar in construction to the previously described collar and sleeve 26 and 27.

In order to minimize injury to operators and to provide other advantages to be mentioned hereinafter, separate tracer material releasing electrodes and logging electrodes are utilized. The logging electrodes, which are indicated by reference characters 66 and 68, are placed outside of the sleeve 64 in the manner of the previously described electrodes 28 and 29. However, they do not include any radioactive material but may be of some suitably electrically conductive material, such as copper or lead. The tracer releasing electrodes, indicated by reference characters 70 and 72, are mounted inside of the drill collar. They may take the form of flat or arcuate plates spaced apart a short distance and mounted within a mud conducting passageway 74 inside housing 76. The housing is surrounded by a shielding sheath 78, which may be formed of lead, thereby to protect the operator handling the drill collar or the tracer releasing unit including the housing 76 and the electrodes 70 and 72.

The efficiency of the release of the tracer material from the tracer electrodes 70 and 72 has been found to increase with a higher rate of mud flow. For this reason the passageway 74 is made of reduced cross section so that the flow of mud through it and past the tracer electrodes is higher than the flow of mud throughout the remainder of the system. One reason for the increased efficiency appears to be a cleaning off from the electrodes of the colloidal material tending to collect upon them by the rapidly flowing mud. The high velocity mud flow also tends to prevent polarization.

The restricted mud flow passageway 74 can be designed to increase the mud velocity to as high as about eighty-eight lineal feet per second compared with a normal annulus flow of about five feet per second. For example, the normal annular cross sectional area between a six inch drill collar and a nine inch bore hole is 35.3 square inches. The diameter of the opening inside the drill collar is normally of the order of two or three inches. If the size of the restricted passageway 74 is made to be on the order of two square inches, a considerable increase in mud flow in the region of the tracer electrode can be effected to eliminate colloid and polarization difficulties.

The tracer electrodes are supplied with a voltage proportional to the rate of flow of the mud as in the previously described embodiment. In this embodiment, the generator is indicated by the reference character 80. It may be a direct current generator generating a voltage proportional to its speed of rotation. It is driven by a mud driven propeller 82 extending outside of a sealed compartment 84 in which the generator 80 and other apparatus is mounted. The connection between the propeller and generator may be through a shaft 86, or other types of coupling, such as a magnetic one, may be used. If a magnetic coupling is used, then the housing 76 may be made of suitable material so that it need not be apertured for the passage of any coupling elements.

In order further to prevent polarization and the accumulation of colloids, which are generally negatively charged, upon the positive tracer electrode, the polarity of the electrodes is periodically reversed. Continuous operation of the apparatus can be had even with periodic reversal of the polarity of the tracer electrodes if, as contemplated, both are made of identical radioactive tracer releasing materials. The reversal of current at periodic intervals injects colloidal materials accumulating during a previous period into the mud stream together with the tracer ions and the electrodes are also depolarized.

The periodic reversal of polarity of the tracer electrodes can be effected by a suitable reversing switch 88 mounted within housing 84. The reversing switch may be periodically operated to reverse the connections of the tracer electrodes to the terminals of the generator. The switch may be operated in a suitable manner, as by the generator through a shaft 90 and reduction gearing 92. The generator is connected to the switch through conductors 94 and the electrodes are connected to the switch through conductors 96.

In order to make the strength and intensity of the signal substantially proportional to the resistivity rather than indicative of the conductivity of the earth's formation in the vicinity of the logging electrodes, the tracer and logging electrodes are connected in parallel. This is readily done by interconnecting electrodes 66 and 70 by conductor 98 and electrodes 68 and 72 by conductor 100.

Figure 6:
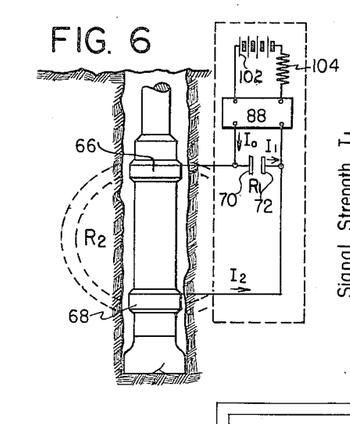
Fig. 6 is a schematic arrangement showing inner signal electrodes associated with the lower portion of a drill string connected in parallel with the outside logging electrodes to provide a higher signal for a higher resistivity formation.

A method of obtaining a signal which gets stronger with increasing formation resistance will now be described in connection with Figs. 6 and 7. Referring first to Fig. 6, it may be noted that the two sets of electrodes 66, 68 and 70, 72 are shown connected through the reversing switch 88 to a source of potential indicated simply as a battery 102 in such manner that the electrodes are in parallel. A resistor 104 having a resistance sufficient to provide a substantially constant current circuit is placed in series with the battery. As indicated, a current $I_0$ flows from the battery to the electrodes. It consists of two components, $I_1$ flowing across the tracer electrodes 70, 72 and $I_2$ flowing across the logging electrodes 66, 68.

It can be shown that in a circuit such as shown in Fig. 6, the signal current $I_1$ (in terms of the substantially constant total current $I_0$) is related to the formation resistance $R_2$ between electrodes 66 and 68 (in terms of the constant mud resistance $R_1$, between the tracer electrodes 70 and 72) by the following equation:

$$\frac{I_1}{I_0} = \frac{1}{1 + \frac{R_1}{R_2}}$$

Figure 7:
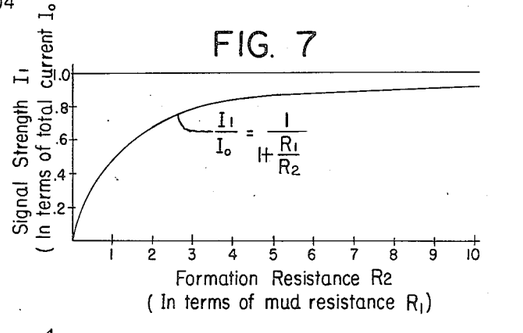
Fig. 7 is a graph illustrating the relationship between signal strength and formation resistance for the parallel arrangement of Fig. 6.

This relationship is graphically depicted in Fig. 7, from which it can be seen that the signal strength increases with the formation resistance.

The relationship, not being linear, has the advantage of showing great sensitivity to small changes in low resistivity values, while the sensitivity to changes in the higher resistance range is considerably less. In other words, this arrangement gives a greater amount of detail in the lower resistance values and less in the high resistance range. By changing the distance between the tracer electrodes, the mud resistance $R_1$ can be varied in such a way that the right amount of detail can be obtained in the proper formation resistance range. At the same time it will still be possible to record higher resistance values without running into high concentrations of radioactive material.

A further embodiment of the invention is illustrated in Figs. 4 and 5. It includes apparatus which can be assembled as a structural unit and thus readily secured to and made part of the drilling apparatus. The drill collar, which is indicated by the reference character 120 is substantially solid but does include a circular passageway 122 running lengthwise through it. A drill bit 124 with the usual openings 126 is secured to the lower end of the drill collar. An insulating shield 128 is secured to the exterior of the drill collar and the spaced apart nonradioactive logging electrodes 130 and 132 are secured to the outside of the sleeve.

The apparatus includes structure defining a compartment 134 of an elongated nature and adapted to fit into an opening 136 in the drill collar. The compartment structure includes a generally channel-shaped main housing member 138 and a closure 140 adapted to be secured as by the screws 142 to the housing 138. The radioactive signal or tracer electrodes 144 and 146 are mounted within a housing 148, which is made of lead and suitably secured to the housing 138. It extends through an opening 150 in the drill collar into the passageway 122 in the drill collar. The electrodes are in a reduced diameter portion of a passageway extending through housing 148. This reduced portion is connected by flaring portions 152 and 154 to the passageway 122 so that the drilling fluid flows downwardly through the passageway 122 and at an increased velocity past and in contact with the tracer electrodes.

The electrodes may be connected in a suitable manner with component parts of the types illustrated in Figures 2 and 3 located within the compartment 134. For example, the tracer electrodes are connected by a pair of conductors 156 in parallel with the logging electrodes by the pair of conductors 158 and these may in turn be connected to apparatus of the type illustrated in compartment 84 in Figure 3. The apparatus located within the compartment 134 has not been illustrated in Figure 4, but it may include a voltage source, such as a battery or the like, a reversing switch, and an electronic spontaneous or natural potential circuit. This unillustrated apparatus may be of a character disclosed in my copending application Serial No. 783,280.

In the construction of the apparatus illustrated in Figs. 4 and 5, the component parts are first assembled in the compartment 134 and the latter is then closed by its cover plate 140. The tracer electrode housing 148 with its electrodes is then secured in place or it can be secured before the cover plate is fastened. To facilitate assembly, the electrode conductors 156 may include plug and socket type connections between housings 134 and 148. The thus assembled apparatus is placed into the drill collar and secured to the latter as by the securing screws 160 (see Fig. 5). The insulating sleeve 128 is then placed in position, after which the logging electrodes 130 and 132 are assembled and finally the drill bit 124 is secured to the lower end of the drill collar.

It may, therefore, be noted that the logging apparatus can readily be constructed and assembled in a drill collar. At the same time the construction provides a high velocity flow of mud past the tracer electrodes, thereby to wipe them clean and prevent polarization and the accumulation of colloids on the electrodes.

Figure 8:
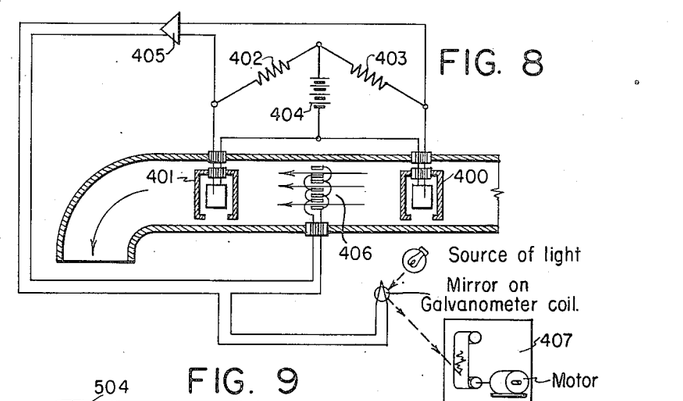
Figs. 8 and 9 illustrate other embodiments of the present invention including apparatus at the surface of the earth for automatically compensating for velocity fluctuations occurring during operations.

In accordance with another feature of the present invention, compensation for variations in the rate of flow of the drilling fluid may be effected at the earth's surface instead of in the bore hole. An arrangement of this character usable with uncompensated tracer release is illustrated in Fig. 8. The compensating apparatus here illustrated includes a Wheatstone bridge comprising four arms as follows: an ionization chamber 400, an ionization chamber 401, a resistor 402, and a resistor 403. The bridge circuit is energized by a battery 404 connected between two opposed terminals of the circuit, and the output voltage of the circuit as developed across the other two terminals thereof is delivered to a direct current amplifier 405. This amplifier delivers its output current through an electrode assembly 406 to the galvanometer coil of a recording element embodied in a strip recorder 407.

The two ionization chambers 400 and 401 are of a conventional type preferably having a capacity of 1 liter and filled with argon at 100 atmospheres. The resistors 402 and 403 have values of $1 \times 10^{11}$ and $2 \times 10^{11}$ ohms, respectively. The amplifier 405 is a conventional direct current amplifier capable of a large direct current output, and the electrodes 406 consist of two groups, each comprising a series of spaced metallic electrode plates. The electrode plates belonging to these two groups are alternately interconnected as shown in the figure, and the anode group of plates contains a radio active material which is identical to the one used in the electrode ring 29. It will be seen that the resistor 403 has twice the ohmic value of the resistor 402 and, consequently, the Wheatstone bridge is balanced only when the resistance of the ionization chamber 400 is twice the resistance of the ionization chamber 401, i. e., when the radioactivity of the mud in the immediate neighborhood of the ionization chamber 400 is one-half the radioactivity of the mud in the immediate neighborhood of the ionization chamber 401.

In the operation of the detecting apparatus just described, the electrodes 406, when supplied by a current from the amplifier 405 place the radioactive tracer material in solution in the mud at a rate determined by the magnitude of the output current of the amplifier 405. When the radioactivity in the neighborhood of the ionization chamber 401 is less than twice the radioactivity in the neighborhood of the ionization chamber 400, the Wheatstone bridge is unbalanced and a voltage representative of the degree of this unbalance is supplied to the amplifier 405. Since the output terminals of the amplifier are connected to deliver the amplifier output current to the electrodes 406, the current passing between the electrodes 406 in the drilling fluid is proportional to the unbalance in the Wheatstone bridge. The radioactive material of which the electrodes 406 are made is dissolved in the drilling fluid in accordance with the variation of the current traversing the electrodes in the exact manner previously explained. This process continues until the radioactivity of the mud in the neighborhood of the ionization chamber 401 is raised to a bridge balance value of almost twice the value of the radioactivity in the neighborhood of the ionization chamber 400. As this balance is approached, the voltage input to the amplifier 405 becomes relatively small.

Assume now that the radioactivity of the mud stream flowing out of the drill hole towards the ionization chamber 400 increases from a value at which a balanced condition of the system prevails. In response to this radioactivity increase, the output voltage of the bridge circuit immediately increases, thus causing more radioactive material to be dissolved into the mud stream by the electrodes 406 until the system balance is again established. On the other hand, if the radioactivity of the mud coming out of the casing towards the ionization chamber 400 decreases, then the output voltage of the bridge circuit is correspondingly decreased, thus causing less radioactive material to be dissolved into the mud stream by the electrodes 406 until a condition of system balance is again established. It will thus be understood that the radioactivity in the neighborhood of the ionization chamber 401 is always maintained about twice the radioactivity in the neighborhood of ionization chamber 400, and that the unbalance or output voltage of the Wheatstone bridge circuit is a measure of the radioactivity which is added to the mud stream to maintain such a relationship.

It will also be apparent that the current passing through the electrodes 406 varies with the radioactivity content of the drilling mud in accordance with a relationship that is similar to the one between the current passing through the electrode ring 28 and the corresponding amount of radioactive tracer dissolved into the mud. The arrangement comprising the electrode ring 28 can be visualized as a transducer converting the different current intensities into corresponding quantities of radioactivity. The arrangement comprising the electrodes 406 is an inverse transducer, which reconverts the radioactivity that has migrated to the earth's surface back into an electrical current which flows from the output terminals of the amplifier 405. The magnitude of this current is recorded by the strip recorder 407 and provides a reliable index of the formation conductivity which is obviously made independent of fluctuations of the mud velocity and of the natural decay of the radioactive tracer material in electrode 28.

Figure 9:
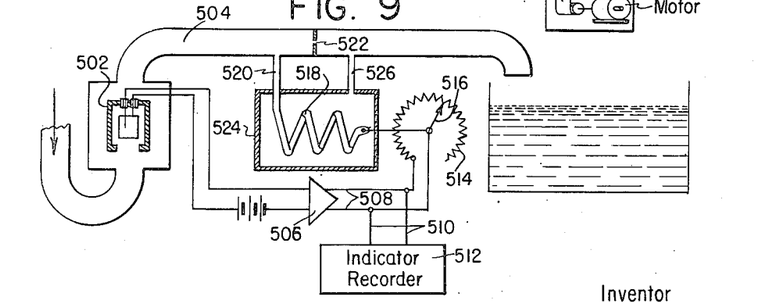

A further embodiment of the invention for providing compensation at the surface of the earth for variations in carrier fluid velocity is illustrated in Fig. 9. In this arrangement, compensation is provided by multiplying the signal strength by the speed of the carrier fluid flow. The amplitude of the signal detected at the earth's surface is inversely proportional to the velocity of the carrier fluid so that compensation can be obtained by multiplying the signal with the rate of flow.

The apparatus includes an ionization chamber 502 mounted in a fluid conducting conduit 504. Its output is connected to the input 506 of a conventional direct current amplifier, the output of which is, in turn, connected by conductors 508 and 510 to the input of an indicator-recorder 512. The amplifier output circuit is connected also to a variable resistor 514 which is adjusted in accordance with the fluid flow to provide the desired compensation. The resistance is varied by a movable conducting element 516 engageable therewith and which is connected, together with one end of the resistor, to the amplifier output. The position of arm 516 is varied in accordance with the fluid flow by a Bourdon spiral 518 connected by conduit 520 to the main fluid conduit 504 ahead of an orifice 522. The spiral is mounted within a closed housing 524 connected by a conduit 526 to the main conduit 504 behind the orifice 522.

In operation, the ionization chamber 502 provides an electrical output indicative of the radioactivity present in the carrier fluid. Its output is amplified by the amplifier 506 and supplied to the recorder-indicator 512. The apparatus is calibrated for operation at some predetermined velocity of fluid. When the velocity varies, the pressure drop across the orifice changes accordingly and the resistance 514 in the amplifier output circuit is varied by movement of the contact arm 516. This movement is such as to compensate for the variation in radioactivity resulting from variation in the fluid velocity. As the fluid velocity increases, the concentration of radioactive tracer in the fluid carrier decreases and the output of the amplifier also decreases. The variable resistance 514 in the circuit is increased in order to supply a greater portion of the amplifier output to the recorder, thereby to compensate for the effect of the increased fluid velocity.

As earlier indicated, another feature of the present invention is the provision of new and improved electrodes that are well suited for performing the function of releasing the signal bearing radioactive material in the mud stream. In general, the electrode materials should meet three main requirements; first, they should be susceptible to neutron irradiation and be easily changeable into radioactive isotopes with gamma or beta radiation which can be easily measured and having desired half-lives; second the radioactive tracer material should be such that it can be dissolved, dispersed, or released in ordinary mud in quantities proportional to electric current flow; and third, the tracer material should be removable if the half-life is too long, so as to avoid an accumulation of that material in the mud which might interfere with the accuracy of subsequent measurements.

As far as the half-life of the first requirement is concerned, it should be of the order of hours if it is feasible to irradiate the material in place at the bottom of the hole with a neutron source and if it is impractical or difficult to remove the material from the mud after its measurement at the surface. It can be of the order of days up to a week if it is impractical to irradiate the material in place at the bottom of the hole and if it is impractical or difficult to remove the material from the mud after its measurement at the surface. The half-life can be unlimited if it is feasible to remove the material by simple means after its measurement at the surface.

The dissolution, dispersal or release, can be achieved in different ways. According to one way, a suitable radioactive anode metal is dissolved by an electrolytic dissolving action of the anodic-oxidation type according to the reaction where X stands for any suitable metal; $n$ stands for valency or oxidation number of the metal, and E stands for the amount of negative electric charge to be neutralized at the anode when metal X is electrolytically dissolved.

The metal should:

1. Not be readily oxidized by water or oxygen like the alkali-metals, calcium, etc.

2. Not form an insoluble surface film of metal sulphate or chloride in mud, such as would be the case with silver or lead electrodes.

3. Not form an insoluble hydroxide at the pH of the mud, as is the case with most metals of oxidation number three or higher.

4. Not form ions which may be reduced back to metal by the iron drill pipe and casing present in the well and thus deposited before reaching the surface, such as may be the case with metals which are relatively noble.

Some radioactive isotopes, which can be used in making suitable "anodic-oxidation type" electrodes, are:

$Cd^{115}$ (T½ 2.3d, 1.11 m. e. v. β)
(T½ 43d, 1.5 m. e. v. β, 0.5 m. e. v. γ)
$Co^{60}$ (T½ 5.34y, 0.3 m. e. v. β, 1.1 and 1.3 m. e. v. γ)
$Cu^{64}$ (T½ 12.8h, 0.6 m. e. v. β)
$Fe^{59}$ (T½ 44d, 0.26 and 0.46 m. e. v. β, 1.1 and 1.3 m. e. v. γ)
$Zn^{65}$ (T½ 250d, 0.4 m. e. v. e+, K-capture, 1.14 m. e. v. γ)

The electrolytic dissolving action can also be of the cathodic reduction type, whereby a compound is reduced to a metal with a simultaneous liberation of negative ions. This makes it impossible to use some nonmetallic tracers, such as bromine, iodine, sulphur and phosphorus. Some typical reactions would be:

Some pertinent considerations follow:
1. The use of insoluble bromides, iodides, sulphates, phosphates, etc., permits the use of radioactive isotopes of the nonmetallic elements bromine, iodine, sulphur, phosphorus, etc.
2. The compound should be deposited on a conductor, which would serve as the electrode. The conductor could be made of the same metal, which is also used in the compound, the compound being prepared by electrolytic deposition (e. g., AgI could be deposited on metallic Ag by electrolytic oxidation).
3. The compound used must be very insoluble in the mud stream and must strongly adhere to the supporting electrode, while electrolytic corrosion must be low.
4. The compounds should preferably be prepared from radioactive isotopes of high specific activity so that the deposits can be very thin. This is necessary to avoid serious increase in the resistance of the circuit and flaking. By having high specific activity, only very small electrolytic currents are required.

Some radioactive isotopes which are likely to make suitable cathodic reduction type electrodes are:

$I^{131}$ (T½ 8d, 0.6 m. e. v. β, 0.367 and 0.08 m. e. v. γ)
$P^{32}$ (T½ 14.3d, 1.69 m. e. v. β)
$S^{35}$ (T½ 87.1d, 0.17 m. e. v. β)

The electrolytic dissolving action can be indirect when a nonradioactive metal anode acts only as a carrier for a nonmetallic substance such as radioactive phosphorus, sulphur, etc., which is dissolved in and chemically combined with the nonradioactive anode metal. When the anode dissolves under the influence of the electric current, the nonmetallic radioactive substance dispersed in it will be released at the same time in proportion to the dissolution of the metal, and can therefore be made to act like a quantitative tracer.

The tracer materials can also be removed in a number of ways. One is by electrochemical means without applied voltage. If the tracer is a metal whose ions are sent in solution into the mud by the electrolytic current at the bottom of the hole (anodic oxidation type), the ions can be removed after measurement at the surface by bringing the mud in intense contact with a less noble metal. For instance, if radioactive cadmium is used as a tracer material, it can be precipitated from the mud after measurement by bringing it in close contact with baser metals such as zinc, magnesium or aluminum. These metals, having a higher solution potential than Cd, will then dissolve and take the place of the nobler tracer ions, which are reduced to the metallic state and thereby removed from the mud.

An equipment for removing the radioactive tracer in the above described manner is shown diagrammatically as the chamber 600 in Fig. 1. Before the mud is allowed to return to the slush pit it is passed through the chamber which contains apparatus for removing the radioactive material from the mud by an electric process which consists in providing materials having a large area of contact with the mud. The materials possess an electric property such that they will tend to replace any metals that are in solution in the drilling fluid. These materials could be either metallic surfaces of a metal higher in the electrochemical series of elements or electrodes that are artificially charged from an external source of E. M. F.

An apparatus especially adapted to displace radiocadmium is illustrated in Figure 10. The chamber entrance and exit are provided with screens 602 and the chamber is filled with magnesium, aluminum or zinc pellets or shavings 604 which are arranged so as to exhibit a large area of contact to the passing fluid. In operation, the fluid flows through the chamber in the direction of the arrows. It comes into intimate contact with the magnesium, aluminum or zinc pellets 604 and because magnesium, aluminum or zinc are higher in the electromotive series, the magnesium, aluminum or zinc metal will tend to replace the radiocadmium that is in the solution in the drilling fluid. Instead of magnesium, aluminum or zinc pellets any other suitable material that is higher in the electromotive force series of elements, as, for example, manganese, chromium, beryllium, etc., can be used.

In a special case, where a material such as radio-iodine is injected as a tracer into the mud stream by means of the cathodic-reduction process, it is feasible to remove this tracer after measurement by bringing the mud in intimate contact with certain noble metals such as silver or copper on which a coating of silver or copper iodide will form.

Another way to remove the tracer is by electrochemical means and the use of an applied voltage. It is feasible to achieve removal of metallic contaminants from the mud through electrolytic reduction and deposition on electrodes by means of application of the proper voltage. In this case special means must be provided to periodically remove colloid accumulation on the anode. An arrangement of this character is shown in Fig. 11. It comprises a series of parallel plates 610 and 612 in chamber 608 which are interconnected so that alternate plates are connected to one side of the battery 614 and the other set of plates is connected to the other side of the battery. The difference of potential applied produces an electric field which extracts the ions of radiotracer material by plating them on to the surface of the electrodes 610 and 612.

It has been found that an arrangement such as shown in Fig. 11 clogs with colloidal particles from the drilling fluid that adhere to the surface of the electrode 610. This can be limited by momentarily reversing the potential to throw off the colloids, as by connecting the plates to additional battery 616 having a higher voltage than the battery 614. This can be done readily by a switch 618 driven by a geared synchronous motor 620 arranged momentarily and periodically to connect battery 616 into the circuit in such a way that a strong reverse current is produced for a very short period of time.

A further way to remove the tracer is by an oxidation-aeration process. In the special case where a radioactive element such as iodine is injected into the mud stream by means of the cathodic-reduction process, it is feasible to remove the tracer material by oxidizing and removing it as iodine vapor by aerating the mud stream.

Work thus far indicates that excellent results are obtainable with cadmium. It is susceptible to neutron irradiation and produces a radio-isotope $Cd^{115}$ which is both a gamma and beta emitter of suitable half-life (2.8 and 43 days). Cadmium also dissolves into ordinary rotary mud in quantities proportional to the current applied. The reaction is quantitative and appears to be very little affected by temperature variations and by the length of the current impulses. Even impulses as short as one second produce proportional results. Cadmium, furthermore, is less noble than iron and will therefore not plate out on the drill pipe on the way to the surface. It can, however, be removed from the mud by bringing it into intense contact with baser metals, such as zinc, aluminum or magnesium after measurement, without the use of an applied voltage.

In so far as the cathodic reduction of compounds is concerned, such a process using silver or mercuric iodide as cathode material can be used with radioactive iodine as tracer material. It has a half-life of eight days and will not plate out on the drill pipe and can be removed after measurement in a fairly simple manner by either contact with metallic silver or copper or by oxidation-aeration. Next to radio-cadmium, radio-iodine appears now to be the most practical tracer material.

While the present invention has been described in connection with details of certain illustrative embodiments thereof, it should be understood that these details are not intended to be limitative of the invention except in so far as set forth in the accompanying claims.

Having thus described my invention, what I claim as new and desire to secure by Letters Patent of the United States is:

1. The method of transmitting signals to the surface of the earth from within a bore hole extending into the earth which comprises: circulating a stream of carrier fluid into and out of the bore hole; introducing a detectable tracer signal into the said fluid stream within the bore hole; detecting the thus introduced tracer signal in the said fluid stream arriving at the surface; and compensating for changes in said signal resulting from variations in the rate of flow of the said fluid.

2. The method of determining at the surface of the earth values of a formation characteristic at a subsurface location within a bore hole extending into the earth which comprises: circulating a stream of carrier fluid into and out of the bore hole; introducing a characteristic-indicating radioactive tracer signal into the fluid stream within the bore hole; detecting the thus introduced tracer signal in the said fluid stream arriving at the said surface to obtain an indication representative of the value of said characteristic; and compensating for changes in the introduction of said tracer signal into said fluid stream resulting from variations in the rate of flow of the said fluid.

3. The method of determining at the surface of the earth values of a formation characteristic within a bore hole extending into the earth which comprises: circulating a stream of carrier fluid into and out of the bore hole; releasing a radioactive tracer into said stream of fluid within the bore hole at a rate proportional to the value of said characteristic and proportional to the rate of flow of the fluid; and detecting and measuring the tracer in the fluid stream arriving at the surface to obtain an indication of the value of said characteristic.

4. The method of determining at the surface of the earth values of a quantity to be measured within a bore hole extending into the earth which comprises: circulating a stream of carrier fluid into and out of the bore hole; introducing a detectable tracer into the fluid within the bore hole at a rate proportional to the value of the quantity to be measured; detecting and measuring the concentration of the thus introduced tracer arriving in the fluid stream at points spaced apart along the direction of flow of the said stream at the surface; locally adding tracer to said carrier fluid stream between said points in amount sufficient substantially to compensate for changes in such concentration resulting from variations due to said introduction of tracer into the fluid within the bore hole; and recording a measure of the amount of locally added tracer.

5. The method of determining at the surface of the earth values of a quantity to be measured within a bore hole extending into the earth which comprises: circulating a stream of carrier fluid into and out of the bore hole; introducing a detectable tracer into the said fluid within the bore hole at a rate indicative of the value of said quantity, measuring the tracer in the said fluid arrival at the surface; and modifying the magnitude of the measurement thus obtained by a factor bearing a predetermined functional relationship to the rate of flow of the fluid.

6. Apparatus for transmitting a signal to the surface of the earth from within a bore hole extending into the earth including; fluid circulating means for circulating a stream of carrier fluid into and out of the bore hole; movable detectable tracer supplying means for introducing a detectable tracer signal into said stream of fluid within the bore hole; tracer detecting and measuring means at the surface of the earth for measuring the thus introduced tracer in the said fluid arriving at the surface; and means associated with said measuring means for compensating the measurement for changes resulting from variations in the rate of flow of the said fluid.

7. Apparatus for determining at the surface of the earth values of a quantity to be measured within a bore hole extending into the earth including; fluid circulating means for circulating a stream of carrier fluid into and out of the bore hole; movable detectable tracer supplying means for introducing a detectable tracer into said stream of fluid within the bore hole at a rate indicative of the value of said quantity; a pair of similar, spaced apart tracer detecting means adjacent the fluid stream at the surface of the earth, capable of detecting the quantity of tracer in the said fluid arriving at the surface in said stream; bridge means including one of said detecting means in each of adjacent legs thereof, said bridge means being balanced when the concentration of tracer in the said fluid in the region of one of said detecting means bears a predetermined ratio to the concentration of tracer in the said fluid in the region of the other detecting means, tracer releasing means for releasing tracer into the said fluid stream between said detecting means; means controlled by said bridge means for controlling the said release of tracer by said last mentioned releasing means in accordance with a function of the unbalance of said bridge means; and means for indicating a measure of the amount of tracer released by said tracer releasing means.

8. Apparatus for determining at the surface of the earth values of a quantity to be measured within a bore hole extending into the earth including; fluid circulating means for circulating a stream of carrier fluid into and out of the bore hole; movable detectable tracer supplying means for introducing a detectable tracer into the said stream of fluid within the bore hole at a rate indicative of the value of said quantity; tracer detecting means at the surface of the earth responsive to the quantity of the tracer in the said stream of fluid to produce an electric signal indicative of said quantity of tracer; variable resistance means in circuit with said detecting means to vary said electric signal; and fluid rate of flow responsive means operatively connected to said resistance means to vary said resistance to compensate said signal for changes resulting therein from variation in the rate of flow of the said fluid.

9. Bore hole logging apparatus for logging a bore hole in conjunction with a carrier fluid circulating through the bore hole including: a pair of spaced apart electrodes at least one of which is capable of releasing a radioactive tracer into such fluid upon the application of a voltage across the electrodes when in contact with such fluid; voltage supply means including a variable voltage generator connected to the said electrodes for supplying a voltage between the said electrodes, and means actuated by the flow of said carrier fluid and operative in connection with said generator to vary said voltage in accordance with a predetermined function of the rate of flow of said fluid.

10. Bore hole signaling apparatus including: an element adapted to be lowered into the bore hole and through which a carrier fluid may flow; a pair of spaced tracer electrodes within said element; a pair of spaced logging electrodes located outside said element, said electrodes being insulated from one another and adapted to make electrical contact with said carrier fluid; radioactivity shield located between the two pairs of electrodes; and means to supply said tracer electrodes with current having a predetermined relation to the resistance of the current path including said fluid between said logging electrodes.

11. Bore hole signaling apparatus including: an element adapted to be lowered into the bore hole and through which a carrier fluid may flow; structure defining a passageway of reduced size within said element through which the fluid flows at a higher velocity than through the remainder of the element; and a pair of tracer electrodes mounted within said passageway and adapted to be wiped by the fluid flowing therethrough, at least one of said electrodes including a releasable radioactive tracer material.

12. Bore hole signaling apparatus including: an element adapted to be lowered into the bore hole and through which and outside of which carrier fluid may flow; a pair of spaced apart tracer electrodes within said element, in position to be in electrical contact with the carrier fluid flowing through said element, at least one of said tracer electrodes being capable of releasing tracer material into said carrier fluid by flow of an electric current between said tracer electrodes and through carrier fluid therebetween; a pair of spaced apart logging electrodes outside said element, in position to be in electrical contact with carrier fluid flowing outside of said element; means for electrically connecting said two pairs of electrodes in parallel, and electric current supply means connected in parallel; with said parallel connected pairs of electrodes.

13. Bore holes logging apparatus including: an element adapted to be lowered into the bore hole and through which and outside of which carrier fluid may flow; a pair of spaced, tracer releasing electrodes positioned within said element and a pair of spaced logging electrodes positioned outside said element; said pairs of electrodes being located for electrical contact with said fluid flowing inside and outside of said element, respectively; means for electrically connecting said two pairs of electrodes in parallel; a source of voltage; and means including a periodically operable reversing switch for connecting said parallel connected pairs of electrodes across said voltage source at periodically reversed polarities.

14. Bore hole signalling apparatus including: a pair of spaced electrodes, at least one of which includes a releasable radioactive tracer material; a source of voltage; and means including a periodically operable reversing switch for connecting said electrodes to said voltage source at periodically reversed polarities.

15. Bore hole signalling apparatus including: an element adapted to be lowered into the bore hole; a lead cylinder mounted within said element; a housing mounted within said cylinder including a restricted fluid passage therethrough and a sealed compartment; a direct current generator mounted within said compartment; a generator driving means mounted within said passageway and drivingly coupled to said generator; a pair of tracer releasing electrodes in said passageway; means including a reversing switch operable by the generator driving means for electrically connecting the said electrodes across said generator; an insulating sleeve surrounding said element; a pair of logging electrodes mounted on the outside of said sleeve in spaced relation; and means including electrical connections for connecting said last mentioned electrodes in parallel with said tracer releasing electrodes.

16. Logging apparatus insertable into a bore hole and usable in connection with a carrier fluid circulating through the bore hole including: a pair of radioactive tracer releasing electrodes located in the path of flow of the carrier fluid; a pair of logging electrodes also located in the path of flow of the carrier fluid and adjacent the side walls of the bore hole so that when a voltage is applied thereacross current flows therebetween through the earth's formation in their vicinity; conductors connecting said pairs of electrodes in parallel; and a substantially constant current voltage supply connected across said parallel connected pairs of electrodes.

17. Logging apparatus insertable into a bore hole and usable in connection with a carrier fluid circulating through the bore hole including: a pair of radioactive tracer or signal electrodes located in the path of flow of the carrier fluid; a pair of logging electrodes also located in the path of flow of the carrier fluid and adjacent the side walls of the bore hole so that when a voltage is applied thereacross the current flows therebetween through the earth's formation in their vicinity; conductors connecting said pairs of electrodes in parallel; constant current voltage supply means; and means including a reversing switch connecting said supply means across said parallel connected pairs of electrodes.

18. Logging apparatus insertable into a bore hole and usable in connection with a carrier fluid circulating through the bore hole including: a pair of radioactive tracer-releasing electrodes located in the path of flow of the carrier fluid; a pair of logging electrodes also located in the path of flow of the carrier fluid and adjacent the side walls of the bore hole so that when a voltage is applied thereacross current flows therebetween through the earth's formation in their vicinity; conductors connecting said pairs of electrodes in parallel; and means including voltage supply means connected across said parallel connected pairs of electrodes for varying the current flow across said tracer-releasing electrodes substantially directly in proportion to the variation in resistivity of the said earth's formation.

19. The method of bore hole signal transmission including: circulating a fluid into and out of the bore hole; releasing a detectable radioactive tracer into the said fluid within the bore hole at a rate proportional to the velocity of the said fluid and at a rate bearing a predetermined functional relationship to said signal to be transmitted; detecting the tracer at the surface of the earth; and then removing a portion of the tracer from the said fluid.

20. Bore hole signal transmission apparatus including: means for circulating a fluid stream into and out of the bore hole; means for substantially continuously releasing a detectable radioactive tracer into the said fluid stream within the bore hole in an amount indicative of the signal to be transmitted; means for detecting the tracer in said fluid stream arriving at the surface of the earth; and means for substantially continuously removing tracer from the said fluid stream.

21. The method of determining, at the surface of the earth, values of a physical quantity to be measured at subsurface locations within a bore hole extending into the earth, comprising: circulating a stream of carrier fluid into and out of the bore hole; introducing a radioactive tracer into said fluid stream at a point within the bore hole; controlling the rate of said introduction in accordance with a predetermined function of the said values to be measured and in direct proportion to the rate of flow of said fluid stream at said point of introduction of said tracer; and measuring the concentration of the thus introduced tracer in the said fluid stream arriving at the said surface of the earth to obtain a measure there, representative of the said values to be determined.

22. The method of determining, at the surface of the earth, values of a physical quantity to be measured at subsurface locations within a bore hole extending into the earth, comprising: circulating a stream of carrier fluid into and out of the bore hole; introducing a radioactive tracer into said fluid stream at a point within the bore hole; varying the rate of said introduction in a manner indicative of the said values to be measured, and in a manner compensating for changes in rate of flow of said fluid stream at said point of introduction of said tracer; and detecting the variations in the thus introduced tracer in the said fluid stream arriving at the said surface of the earth to obtain a signal indicative of the said values to be determined.

23. Borehole signalling apparatus including an element adapted to be lowered into a borehole; a passageway through said element through which carrier fluid may flow; and an electrode mounted within said passageway and positioned therein to be in electrical contact with fluid flowing through said passageway, said electrode comprising a material containing a detectable tracer and electrically dissoluble into said fluid when a current flows between said electrode and said fluid.

24. The method of determining, at the surface of the earth, values of a physical quantity to be measured at subsurface locations within a borehole out of which a stream of carrier fluid is flowing, comprising: introducing a radioactive tracer into said fluid stream at a point within the borehole in response to and at a rate which is significant of said values of said quantity to be measured and substantially proportional to the rate of flow of said fluid stream at the said point of introduction of said tracer; and making measurements in response to and indicative of the concentration of the thus-introduced tracer in said fluid stream arriving at the said surface, whereby the measurements thus made are substantially independent of the rate of flow of said fluid stream and are representative of the values of said physical quantity.

25. The method of determining, at the surface of the earth, values of a physical quantity to be measured at subsurface locations within a borehole out of which a stream of carrier fluid is flowing, comprising: introducing a radioactive tracer into said fluid stream at a point within the borehole in response to and at a rate which is significant of said values of said quantity to be measured; making measurements in response to and indicative of the concentration of the thus-introduced tracer in said fluid stream arriving at the said surface; and compensating the measurements thus made in accordance with the rate of flow of said stream, whereby the compensated measurements thus made are substantially independent of the rate of flow of said fluid stream and are representative of the said values of said physical quantity.

26. Apparatus for determining, at the surface of the earth, values of a physical quantity to be measured at subsurface locations within a borehole out of which a stream of carrier fluid is flowing, comprising: means adapted to be located within a borehole and for introducing a radioactive tracer into said fluid stream at a point within the borehole in response to and at a rate which is significant of said values of said quantity to be measured and substantially proportional to the rate of flow of said fluid stream at the said point of introduction of said tracer; and means for making measurements in response to and indicative of the concentration of the thus-introduced tracer in said fluid stream arriving at the said surface, whereby the measurements thus made are substantially independent of the rate of flow of said fluid stream and are representative of the said values of said physical quantity.

27. Apparatus for determining, at the surface of the earth, values of a physical quantity to be measured at subsurface locations within a borehole out of which a stream of carrier fluid is flowing, comprising: means adapted to be located within a borehole and for introducing a radioactive tracer into said fluid stream at a point within the borehole in response to and at a rate which is significant of said values of said quantity to be measured; means for making measurements in response to and indicative of the concentration of the thus-introduced tracer in said fluid stream arriving at the said surface; and means for compensating the measurements thus made in accordance with the rate of flow of said stream, whereby the compensated measurements thus made are substantially independent of the rate of flow of said fluid stream and are representative of the said values of said physical quantity.

JAN JACOB ARPS.

References Cited in the file of this patent

UNITED STATES PATENTS

| Number | Name | Date |
|---|---|---|
| 1,534,315 | Hoopes | Apr. 21, 1925 |
| 1,720,325 | Hackstaff et al. | July 9, 1929 |
| 2,147,643 | Dudley | Feb. 21, 1939 |
| 2,182,087 | Leverenz | Dec. 5, 1939 |
| 2,206,634 | Fermi et al. | July 2, 1940 |
| 2,206,922 | Smith | July 9, 1940 |
| 2,220,205 | Buckley | Nov. 5, 1940 |
| 2,225,668 | Subkow et al. | Dec. 24, 1940 |
| 2,241,154 | Neufeld | May 6, 1941 |
| 2,247,417 | Silverman et al. | July 1, 1941 |
| 2,266,355 | Chun | Dec. 16, 1941 |
| 2,313,384 | Lee | Mar. 9, 1943 |
| 2,338,174 | Garrison | Jan. 4, 1944 |
| 2,339,129 | Albertson | Jan. 11, 1944 |
| 2,371,653 | Stewart | Mar. 20, 1945 |
| 2,436,008 | Krasnow et al. | Feb. 17, 1948 |
| 2,440,999 | Anderson | May 4, 1948 |
| 2,468,905 | Warren, Jr. | May 3, 1949 |
| 2,480,674 | Russell | Aug. 30, 1949 |
| 2,507,351 | Scherbatskoy | May 9, 1950 |